United States Patent
Anderson et al.

(10) Patent No.: US 12,353,612 B1
(45) Date of Patent: Jul. 8, 2025

(54) FEEDBACK FOR REQUIRED SENSOR RESOLUTION AND ACCELERATION

(71) Applicant: Intel Corporation, Santa Clara, CA (US)

(72) Inventors: Glen J. Anderson, Beaverton, OR (US); Sangeeta Manepalli, Chandler, AZ (US); Passant Karunaratne, Chandler, AZ (US); Mamatha Balguri, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/398,465

(22) Filed: Dec. 28, 2023

(51) Int. Cl.
*G06F 1/32* (2019.01)
*G06F 1/3287* (2019.01)
*G06F 3/01* (2006.01)

(52) U.S. Cl.
CPC ............ *G06F 3/011* (2013.01); *G06F 1/3287* (2013.01)

(58) Field of Classification Search
CPC .............................. G06F 3/011; G06F 1/3287
See application file for complete search history.

(56) References Cited

U.S. PATENT DOCUMENTS

| | | | |
|---|---|---|---|
| 2020/0294311 A1* | 9/2020 | Holz | H04N 13/271 |
| 2022/0262079 A1* | 8/2022 | Croxford | G06T 15/20 |
| 2022/0291753 A1* | 9/2022 | Erivantcev | G06F 3/0482 |
| 2023/0092938 A1* | 3/2023 | Nguyen | G05B 19/41885 700/56 |

* cited by examiner

*Primary Examiner* — Towfiq Elahi
(74) *Attorney, Agent, or Firm* — Schwegman Lundberg & Woessner, P.A.

(57) ABSTRACT

A system for optimizing sensor data processing in a shared virtual environment can include a processor and a memory storing instructions. The instructions can be executable by the processor to cause the processing circuitry of the processor to receive context data indicative of a virtual environment interaction, determine a fidelity requirement for sensor data based on the context data, and adjust sensor data processing parameters to align an output fidelity with the fidelity requirement.

18 Claims, 7 Drawing Sheets

FEEDBACK FOR REQUIRED SENSOR RESOLUTION AND ACCELERATION

BACKGROUND

Virtual environments are becoming more popular for (e.g., gaming, conferencing, messaging, e-commerce, and social media applications. In these environments, users can be represented by avatars. Algorithms can track user movements, gestures, and expressions to create realistic representations. However, tracking users at high fidelity to render avatars may require significant computing resources, which can reduce the battery life of devices.

BRIEF DESCRIPTION OF THE DRAWINGS

Various examples are illustrated in the figures of the accompanying drawings. Such examples are demonstrative and not intended to be exhaustive or exclusive examples of the present subject matter.

DETAILED DESCRIPTION

Versatile applications across various contexts are offered by avatars enhanced with user tracking. Designed primarily for the viewing of others, these avatars allow for individual previews of personal avatar representations. In shared virtual environments, the representation of oneself as a live avatar can be enabled for PC users, utilizing capabilities such as facial expression, hand/finger, and body-pose tracking. However, it is noted that the simultaneous running of multiple tracking algorithms can lead to high power consumption, adversely affecting the device's battery life. Additionally, detailed features like facial tracking in shared virtual environments might not be visible to others due to user proximity. Consequently, unnecessary power usage and battery drain are caused by running facial tracking when it is not visible or discernible to others, (e.g., when the avatar's rendering in an image is small or when there are many avatars that are not the main focus (e.g., support cast or non-player characters (NPCs))). To address this, adjustments can be made to align the output fidelity of a user's device with the fidelity requirements of the shared virtual environment, ensuring efficient use of resources.

The desired fidelity level for input into virtual environments and related AI models can be guided by contextual factors within applications. Based on these factors, AI models can be selected, and the system can adjust sensor usage, thereby aligning power consumption with fidelity requirements. This approach can provide an optimal balance between resource efficiency and fidelity representation in the shared virtual environment.

User, PC, and application contexts, such as the virtual distance between users, can be monitored by the system to determine the necessary fidelity for AI processing. Depending on the required fidelity, sensor data may be less frequent, down-sampled, or downscaled to facilitate more efficient processing, aligning the output fidelity with the environment's fidelity requirement. Furthermore, the system can automatically select different levels of detail (e.g., based on models, model parameters, AI accelerators, graphics shaders, or mesh complexity to refine output fidelity further).

Fidelity requirements can be ascertained by tracking contextual factors like user attention levels, virtual distances between user avatars, the nature of the game or application, and specific activities within an application. For instance, the necessity for high-fidelity expressions, gestures, postures or movements in psychological interactions, the visibility of avatars on other players' screens, and the type of activity (e.g., fighting, talking, playing sports, social interaction) dictate the level of detail required in the shared environment's representation.

Control of various parameters of components on the user device is employed by the system using these determined fidelity requirements. This control mechanism aims to tune the output fidelity to match the fidelity needs of the shared virtual environment, optimizing both user experience and device efficiency. Another variant is with a set performance parameter (e.g. battery-saving, balanced or performance) to adapt fidelity or fidelity parameters to this performance parameter, which has the benefit that battery usage and leftover operating time on battery might be better determinable.

The above discussion is intended to provide an overview of the subject matter of the present patent application. It is not intended to provide an exclusive or exhaustive explanation of all embodiments. The description below provides further information about the present patent application.

Figure 1:
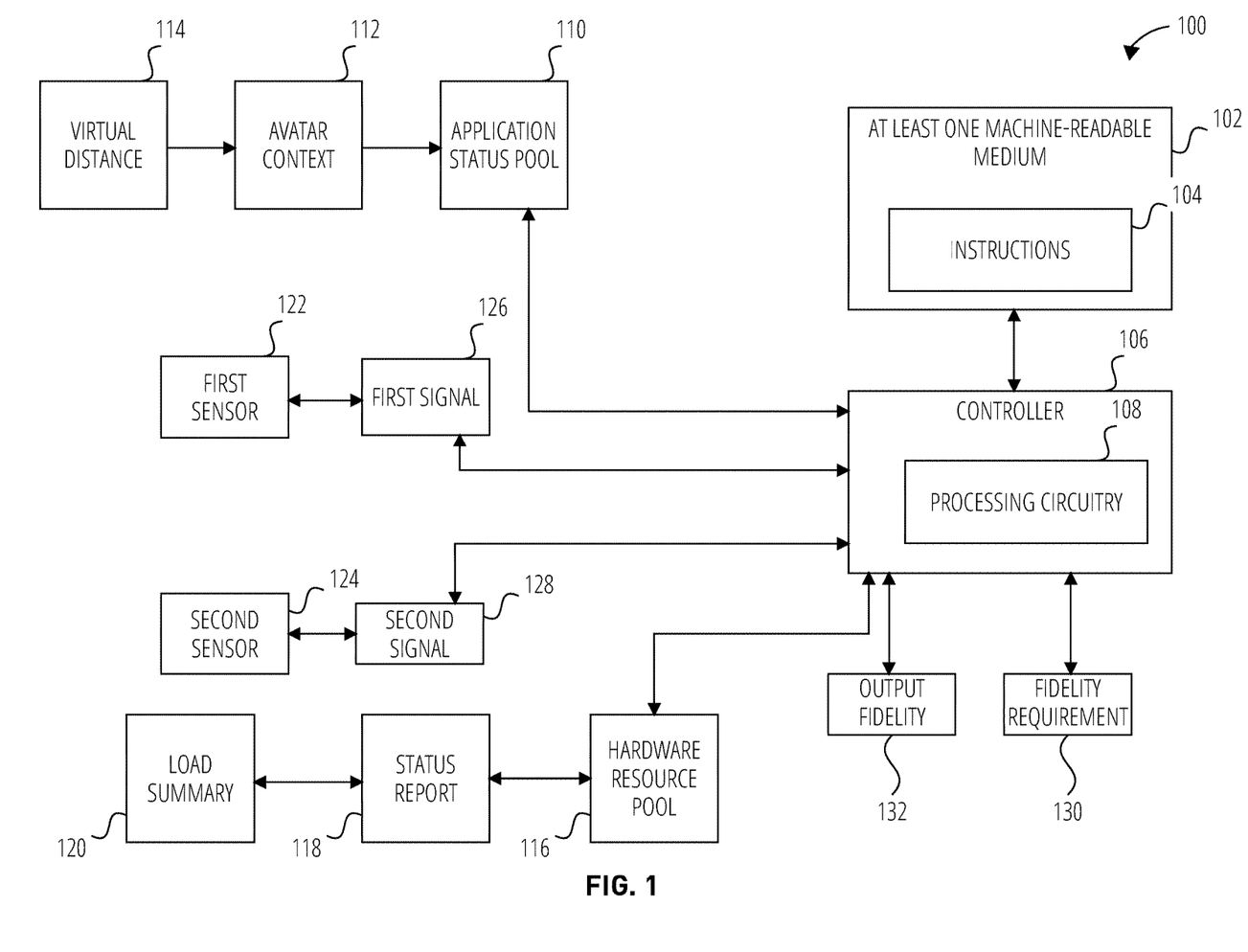
FIG. 1 is a block diagram of an example system for feedback for required sensor resolution and acceleration in shared virtual environments, according to an embodiment.

FIG. 1 is a block diagram of an example of a system 100. The system 100 can be configured to tune an output fidelity of sensors of a user device to tune the output fidelity of the user device to the required fidelity of a shared virtual environment. The system 100 can include at least one machine-readable medium 102 including instructions 104, a controller 106 including processing circuitry 108, an application status pool 110 including avatar context 112 and a virtual distance 114, a hardware resource pool 116 including a status report 118 and a load summary 120, a first sensor 122 transmitting a first signal 126, a second sensor 124 transmitting a second signal 128, a fidelity requirement 130, and an output fidelity 132.

The at least one machine-readable medium 102 can include instructions 104. The instructions 104 can be executed by processing circuitry 108 of the controller 106 to cause the processing circuitry 108 to receive the avatar context 112 from the application status pool 110. The avatar context 112 can include the virtual distance 114 between computing users associated with avatars in a shared virtual environment. The avatar context 112 can also optionally include a type of activity completed by the avatars within the shared virtual environment. Such activities can be solely focused on the other avatars shown on a screen of each user or can be based on all users within the shared virtual environment regardless of whether they are shown on a user's screen. The avatar context 112 can also include one or more of a virtual distance (e.g., the virtual distance 114) between avatars within the shared virtual environment, a role of an avatar in the application (e.g., is this a large seminar, large-platform game, or an intimate business meeting or small-scale game), a level of attention for the computing users representing avatars within the shared virtual environment (e.g., can other users representing avatars in the shared virtual environment appreciate or see the finer details of a users avatar within the shared virtual environment) a visibility of avatars within the shared virtual environment (e.g., is the avatar masked, wearing a face covering, or the like), or a type of application defining the shared virtual environment (e.g., recreational, business, or the like).

The instructions 104 can be executed by the processing circuitry 108 to cause the processing circuitry 108 to receive the avatar context 112 and, based on the avatar context 112, determine a fidelity requirement 130 of sensor inputs (e.g., the first sensor 122 or the second sensor 124) to establish the shared virtual environment. In response to the fidelity requirement 130, the instructions 104 can cause the processing circuitry 108 to adjust, alter, or modify one or more operating parameters of the system 100 to tune an output fidelity 132 to the fidelity requirement 130.

The processing circuitry 108 of the controller 106 can also receive the first signal 126 from the first sensor 122 and the second signal 128 from the second sensor 124. Each of the first signal 126 and the second signal 128 can indicate a feature (e.g., facial expression, facial movement, motion of body, motion of hands, hand gestures, or the like) of the computing user associated with avatars in the shared virtual environment. The instructions 104 can also cause the processing circuitry 108 of the controller 106 to update the fidelity requirement based on the feature of the computing user associated with avatars in the shared virtual environment indicated by at least one of the first signal 126 or the second signal 128.

The sensors (e.g., the first sensor 122 and the second sensor 124) can be configured to detect real-world features of the user of the avatar in the shared virtual environment. As such, the system 100 can transmit the detected features of the user to the shared virtual environment via the avatar of the user. The first sensor 122 can include a camera, and the second sensor 124 can include a depth sensor. In such examples, the camera of the first sensor 122 can consume much more power than the depth sensor of the second sensor 124. As such, the instructions 104 can cause the processing circuitry 108 to adjust either the first sensor 122 or the second sensor 124 to tune the output fidelity 132 to the fidelity requirement 130.

The instructions 104 can also cause the processing circuitry 108 to perform operations to reduce a sampling rate, or other operating parameters, of at least one of the first sensor 122 or the second sensor 124 to tune the output fidelity 132 to the fidelity requirement 130. The instructions 104 can cause the processing circuitry 108 to deactivate the first sensor 122, which delivers a higher output fidelity than needed based on the fidelity requirement 130, and activate the second sensor 124, which can have reduced power or processing requirements than the first sensors 122, to tune the output fidelity 132 to the fidelity requirement 130. If the fidelity requirement 130 increases, the instructions 104 can cause the processing circuitry 108 to reactivate the first sensors 122 to increase the output fidelity 132 and tune the output fidelity 132 to the fidelity requirement 130.

The application status pool 110 can include information on the computing capabilities of other users in the shared virtual environment. In response to the computing capabilities of other users in the shared virtual environment, instructions 104 can cause the processing circuitry 108 to perform operations to update the fidelity requirement 130 based on the computing capabilities of the other computing users associated with avatars in the shared virtual environment. As such, the fidelity requirement 130 can be adjusted as the users in the shared virtual environment have different computing capabilities such that the system 100 does not output a greater output fidelity 132 than is required by the fidelity requirement 130. Moreover, the processing circuitry 108 can increase the output fidelity 132 as the fidelity requirement 130 is adjusted due to a user with higher computing capabilities in the shared virtual environment.

The hardware resource pool 116 can be configured to provide information on all the hardware connected to the system 100. For example, the hardware resource pool 116 can include information on different computing devices, such as the central processing unit (CPU), a graphics processing unit (GPU), a hardware processor core, an accelerated processing unit (APU), any other computing processing unit, or any combination thereof. As such, the system 100, or more specifically, the processing circuitry 108 of the controller 106, can send signals to the hardware resource pool 116 to use one or more of the computing devices within the hardware resource pool 116 to tune the output fidelity 132 to the fidelity requirement 130. For example, the instructions 104 can also cause the processing circuitry 108 to perform operations to receive a status report 118 from the hardware resource pool 116. The status report 118 can include a load summary 120 for each hardware component in the hardware resource pool 116. The instructions 104 can also configure the processing circuitry 108 to select a hardware component based on the avatar context 112 to tune the output fidelity 132 to the fidelity requirement 130.

Figure 2:
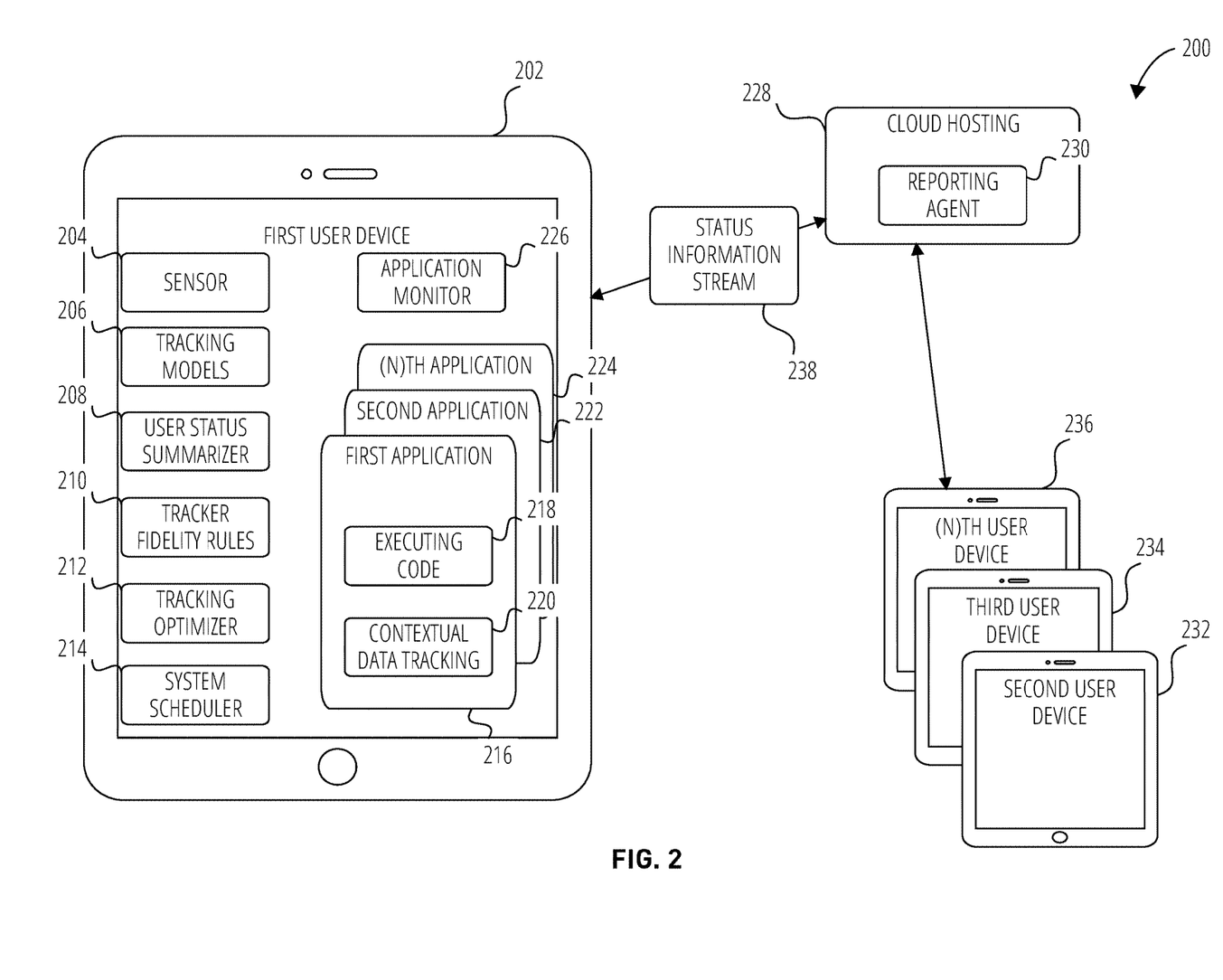
FIG. 2 is a block diagram of an example of a shared virtual environment, including feedback for required sensor resolution and acceleration, according to an embodiment.

FIG. 2 is a block diagram of an example of a shared virtual environment 200. The shared virtual environment 200 can be a gaming environment, video conference calls, metaverse, multiverse, omniverse, another virtual reality universe, collaborative audio calls, or the like. The shared virtual environment 200 can include user devices (e.g., the first user device 202, the second user device 232, the third user device 234, or the (N)th user device 236), and a cloud hosting 228 including a reporting agent 230.

The user devices (user devices 202, 232, 234, and 236) can be a personal mobile device, such as a desktop computer, laptop computer, tablet, headset, or any other computing device that can be used to interact with other users over the shared virtual environment 200. In examples, any number of user devices can be included in the shared virtual environment 200. Each user device connected to the shared virtual environment 200 can be connected through a cloud hosting 228. For example, each device can be directly connected to any other device in the shared virtual environment. Each of the user devices (user devices 202, 232, 234, and 236) can include any of a sensor 204, one or more tracking models 206, a user status summarizer 208, one or more tracker fidelity rules 210, a tracking optimizer 212, a system scheduler 214, a first application 216, a second application 222, a (N)th application 224, and an application monitor 226.

The sensor 204 (e.g., the first sensor 122, the second sensor 124, or the like) can be configured to detect one or more physical features (e.g., movements, gestures, motions, or the like) of a user within the shared virtual environment 200. The sensor 204 can include multiple sensors, including any microphone, camera or depth sensor, a depth camera, other optical sensors, accelerometers, any combination thereof, or the like. The sensor 204 can transmit a signal (e.g., the first signal 126 or the second signal 128 (FIG. 1)) to transmit the detected figure to one or more components of the first user device 202 or other components of the system 100, such as the cloud hosting 228, the second user device 232, the 234, or the (N)th user device 236. The sensor 204 can also transmit the signal to any application (e.g., the first application 216, the second application 222, or the (N)th application 224) on the first user device 202. The sensor 204 can transmit the signal to the contextual data tracking 220 of the first application 216 to provide data for the second application 222 to determine a user context of the user of an avatar within the shared virtual environment 200.

The tracking model 206 can be configured to change settings or parameters of the sensor 204 based on information received from any of the modules, applications, or components of the first user device 202 or the other devices in the shared virtual environment 200. The tracking model 206 can be an AI model that controls the output fidelity of the collection of the sensor 204 on the first user device 202. The tracking model 206 can be adjusted or selected by the system scheduler 214, which will be discussed below.

The user status summarizer 208 can be configured to provide information about the user of an avatar within the shared virtual environment 200. For example, the user status summarizer 208 can determine whether the user is looking at the screen, where on the screen the user is looking, or the like. The user status summarizer 208 can be configured to communicate the user information to any component of the shared virtual environment 200. The user status summarizer 208 can also be configured to communicate the information about the user of an avatar within the shared virtual environment 200 to one or more of the applications (e.g., the first application 216, the second application 222, or the (N)th application 224) to the contextual data tracking 220.

The tracker fidelity rules 210 can be pre-determined rules based on fidelity requirements (e.g., fidelity requirement 130 (FIG. 1)) determined by the system (e.g., the system 100 (FIG. 1)). For example, the tracker fidelity rules 210 can include choosing a sensor that provides a lower fidelity if the system needs to decrease the output fidelity to tune the output fidelity (e.g., the output fidelity 132 (FIG. 1)) to the fidelity requirement. In another example, tracker fidelity rules 210 can include turning on additional sensors to increase the output fidelity to tune the output fidelity to the fidelity requirement. The tracker fidelity rules 210 can also include adjusting settings of one or more components of the first user device 202 based on the fidelity requirement. For example, the tracker fidelity rules 210 can include rules to increase or decrease a frame per second or other sampling frequency of one or more sensors of the first user device 202 to help tune the output fidelity to the fidelity requirement.

The tracking optimizer 212 can be configured to optimize any sensors or modules of the first user device 202. For example, the tracking optimizer 212 can be configured to suggest potential optimizations of the first user device 202 to help tune the output fidelity to the fidelity requirement. For example, the tracking optimizer 212 can transmit the optimizations to the system scheduler 214, the application monitor 226, or to any of the applications (e.g., the first application 216, the second application 222, or the (N)th application 224) to influence any of the components, modules, or applications of the first user device 202.

The system scheduler 214 can be configured to control sensor activation, sensor sampling rate, tracking model selection, and hardware accelerator selection. The system scheduler 214 can receive data from the application monitor 226 and cross-reference that data with the tracker fidelity rules 210 to determine activation of one or more of the sensor 204, alter a sampling rate of one or more of the sensor 204, select one of the tracking models 206, and select a hardware acceleration best to tune the output fidelity to the fidelity requirement.

The applications (e.g., the first application 216, the second application 222, and the (N)th application 224) can include programs, instructions, and information to have the first user device 202 join and operate within the shared virtual environment 200. The applications can include executing code 218 and contextual data tracking 220 to help the first user device 202 operate within the shared virtual environment 200. The applications can receive information from any of the sensor 204, the tracking models 206, the user status summarizer 208, the tracker fidelity rules 210, the tracking optimizer 212, or the system scheduler 214 to influence the avatar representing the user within the shared virtual environment 200. As such, the applications can communicate with the cloud hosting 228 to transmit data about the first user device 202 or receive information about other devices (e.g., the second user device 232, the third user device 234, or the (N)th user device 236) connected to the shared virtual environment 200.

The contextual data tracking 220 can include aspects such as the virtual layout of players in a game, whether other users are physically oriented to the virtual environment, the type of activity happening in a game scene, or the like to generate contextual information for the shared virtual environment 200 to each user with an avatar within the shared virtual environment 200.

The application monitor 226 can be configured to receive data from the contextual data tracking 220 running in the applications (e.g., the first application 216, the second application 222, or the (N)th application 224) to provide information regarding the applications running on the first user device 202. The application monitor 226 can also be configured to receive application information from any of the second user device 232, the third user device 234, or the (N)th user device 236 via the cloud hosting 228. Based on the information provided by the application monitor 226, the system scheduler 214 can open, close, pause, or resume any of the applications (e.g., the first application 216, the second application 222, or the (N)th application 224) on the first user device 202.

The cloud hosting 228 can be configured to provide various application architectures including include peer-to-peer or LAN-based hosting to the devices (e.g., the first user device 202, the second user device 232, the third user device 234, or the (N)th user device 236) connected to the shared virtual environment 200. As shown in FIG. 2, the application monitor 226 of the first user device 202 can receive data from the cloud hosting 228 to help the first user device 202 save power or scale up the performance of the components of the first user device 202 to tune the output fidelity to the fidelity requirement.

Individual devices connected to the cloud hosting 228 can run the system 100 to save power and scale the output fidelity to tune the output fidelity to the fidelity requirement. Thus, not all of the devices (e.g., the first user device 202, the second user device 232, the third user device 234, or the (N)th user device 236) within the shared virtual environment 200 need to run the system 100 (FIG. 1) to match the output fidelity to the fidelity requirement. As such, if the cloud hosting 228 supports the use of the system 100, then individual client devices (e.g., any one or more of the first user device 202, the second user device 232, the third user device 234, or the (N)th user device 236) can subscribe to a status information stream 238 from the cloud hosting 228.

The devices (e.g., any one or more of the first user device 202, the second user device 232, the third user device 234, or the (N)th user device 236) can use the information from the status information stream 238 in their system scheduler 214 to help tune their respective output fidelity to the fidelity requirement of the shared virtual environment 200. Sensor data (e.g., images, video frames, audio signals, any combination of other sensor data, or the like), can be transmitted to any of the applications (e.g., the first application 216, the second application 222, or the (N)th application 224) and analyzed to determine a position of other players within the shared virtual environment 200. In another example, each user's position within the shared virtual environment 200 can be determined by one or more applications (e.g., the first application 216, the second application 222, or the (N)th application 224) ran on each perspective device.

The reporting agent 230 can be configured to transmit and share information about each of the users of avatars within the shared virtual environment 200 to each of the users running the system 100 (FIG. 1). The reporting agent 230 can also provide server-specific information, software, applications, instructions, or the like, to the user devices (e.g., the first user device 202, the second user device 232, the third user device 234, or the (N)th user device 236) of the users represented by avatars within the shared virtual environment 200 to help the user devices communicate within the shared virtual environment 200.

Figure 3:
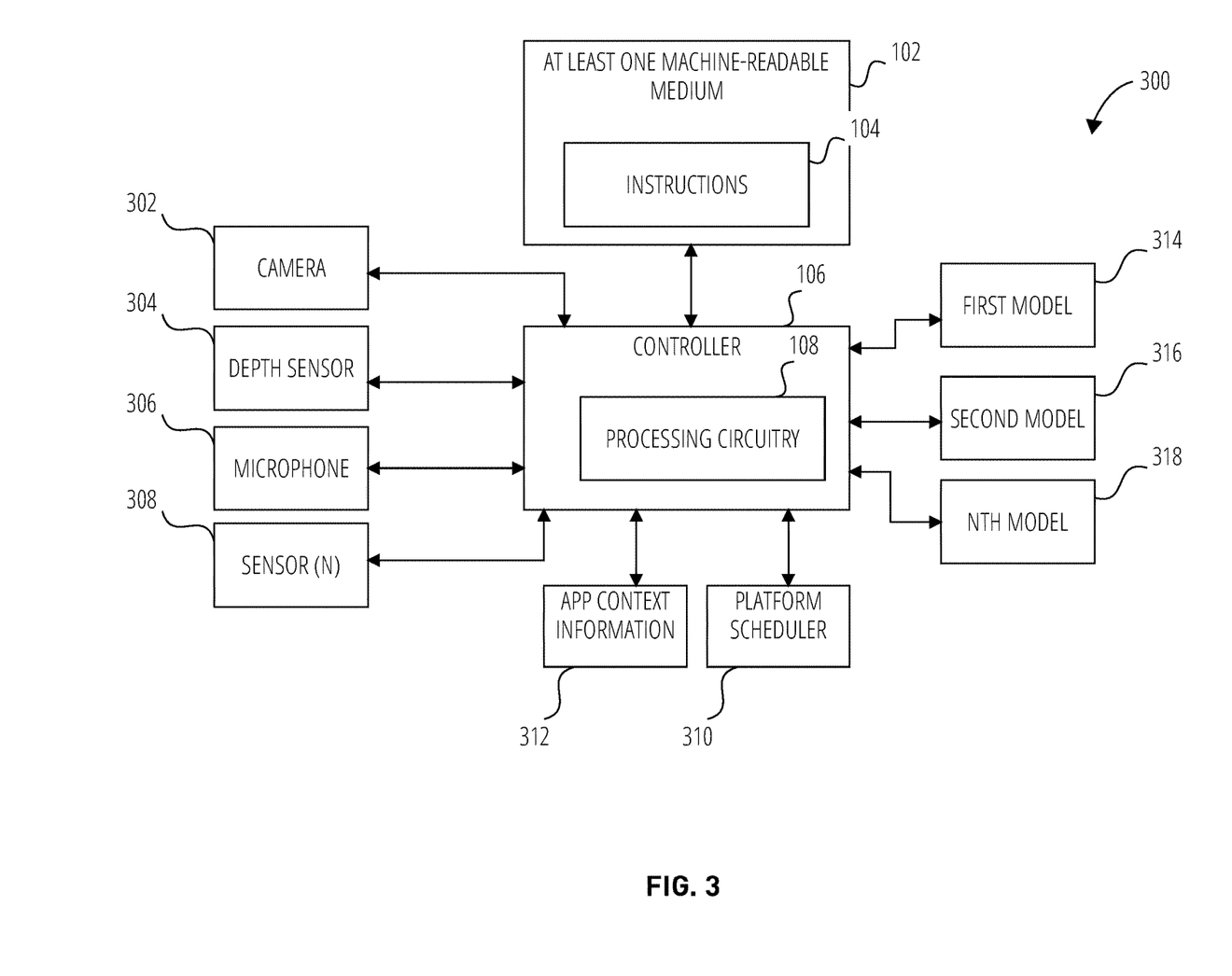
FIG. 3 is a block diagram of an example system for feedback for required sensor resolution and acceleration in shared virtual environments, according to an embodiment.

FIG. 3 is a block diagram of an example of a system 300 to tune output fidelity to fidelity requirement using sensor resolution and acceleration in a shared virtual environment (e.g., the shared virtual environment 200). The system 300 can include at least one machine-readable medium 102, instructions 104, a controller 106, processing circuitry 108, a camera 302, a depth sensor 304, a microphone 306, a sensor (n) 308, a platform scheduler 310, an app context information 312, a first model 314, a second model 316, and an nth model 318.

Each of the sensors (e.g., the camera 302, the depth sensor 304, the microphone 306, and the sensor (n) 308) can be configured to run with different sampling rates, such as, for example, frames per second (FPS). For example, any of the various models (e.g., first model 314, the second model 316, or the nth model 318) can be configured to alter the fidelity, or a sampling rate, of any of the sensors. As such, the sampling rates of each of the sensors can vary from one another based on the selected model.

For example, the camera 302 can be a high quality, high fidelity, RGB camera, which can provide precise and accurate data of the avatar user within the shared virtual environment. The depth sensor 304 can have lower fidelity and less precision than the camera 302. For example, the depth sensor 304 can be STMicroelectronics's FlightSense sensor, a low-cost, low-energy, multi-zone ranging sensor. The depth sensor 304 can create a depth map of the avatar user in the shared virtual environment from up to 4 meters from the depth sensor 304. The depth sensor 304 can be run more efficiently than camera 302 to map user movements. Therefore, when other users of the shared virtual environment are not at a virtual distance to see detailed tracking, the camera 302 could be turned off, thus saving power, and the depth sensor 304 can be used to provide user context to the system 300.

To conserve the energy of the user device (e.g., the first user device 202, the second user device 232, the third user device 234, or the (N)th user device 236), the instructions 104 of at least one machine-readable medium 102 can configure the processing circuitry 108 of the controller 106 to use application app context information 312 to adjust the fidelity or sampling rate of any of the sensors to tune the output fidelity to the fidelity requirement. This saves energy by reducing the output fidelity when the fidelity requirement is not high and increasing the output fidelity when the fidelity requirement is higher than the output fidelity.

The processing circuitry 108 of the controller 106 can transmit controlling signals to the platform scheduler 310 to alter components of the system 300 to tune the output fidelity to the fidelity requirement. For example, based on the controlling signal from the processing circuitry 108, the platform scheduler 310 can select a different model of the models (e.g., the first model 314, the second model 316, or the nth model 318) to be run better to tune the output fidelity to the fidelity requirement. The platform scheduler 310 can also deactivate a sensor (e.g., the camera 302) that provides higher fidelity than needed and activate a lower fidelity sensor (e.g., the depth sensor 304) to tune the output fidelity to the fidelity requirement. In contrast, to increase the output fidelity to tune the output fidelity to the fidelity requirement, the platform scheduler 310 can activate the camera 302 to use instead of, or in addition to, the depth sensor 304.

The processing circuitry 108 can also transmit control signals to the platform scheduler 310 to run a sensor (e.g., any of the camera 302, the depth sensor 304, the microphone 306, or the sensor (n) 308) at a lower FPS or otherwise lower sampling rate. The controlling signal can also limit the FPS provided to the models (e.g., the first model 314, the second model 316, or the nth model 318). For example, the platform scheduler 310 can operate a lower fidelity model, including a deep neural network DNN optimized with Open VINO™.

The processing circuitry 108 can also transmit control signals to the platform scheduler 310 to choose a more power-conserving hardware accelerator (for example, in some cases, a GPU may provide more fidelity than needed, and a Meteor Lake™ neural processing unit (NPU) could fulfill match the fidelity requirement while saving power for the user device.

The app context information 312 can provide avatar context, such as avatar context 112 (FIG. 1). Such information can increase or decrease the fidelity requirement. Thus, the processing circuitry 108 can tune the output fidelity (e.g., the output fidelity 132 (FIG. 1)) to the fidelity requirement to optimize the user devices while providing the highest quality avatar experience within the shared virtual environment.

The models (e.g., the first model 314, the second model 316, and (N)th model 318) can be configured to control various components of the system 300. In examples, the processing circuitry 108 of the controller 106 can pick various models to improve the efficiency of the system 300 based on any of the system component information (e.g., from the camera 302, the depth sensor 304, the microphone 306, the sensor (n) 308) or app context information from the app context information 312, or hardware information from the platform scheduler 310 or the hardware resource pool 116 (FIG. 1)). The models can control any of the components of the user device to tune the output fidelity to the fidelity requirement and ultimately improve the efficiency of the user device while improving the quality of the users' experience of the avatars within the shared virtual environment. The models can also tune a sampling rate, or fidelity, of any components of the user devices.

Figure 4:
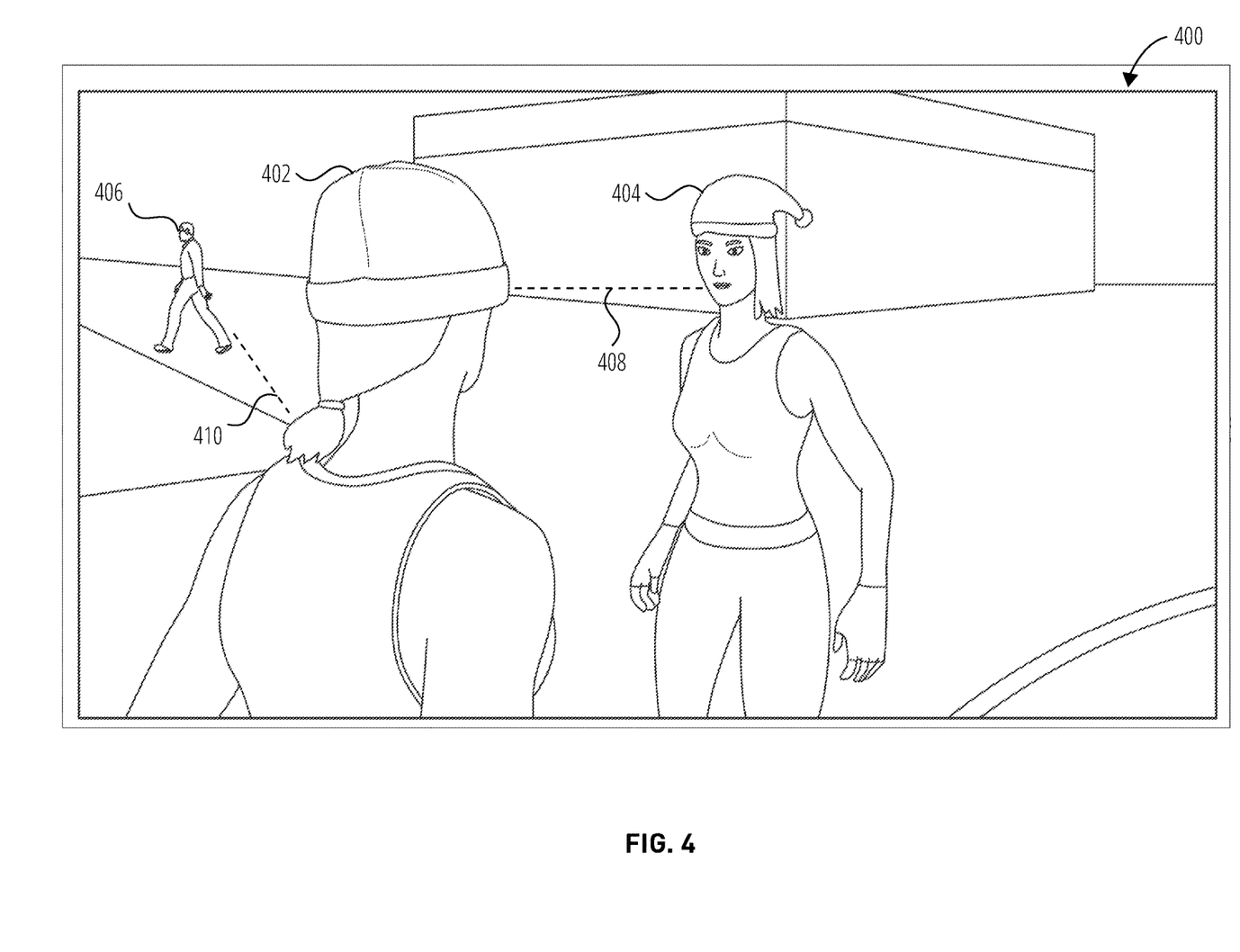
FIG. 4 is an example of a shared virtual environment, according to an embodiment.
Figure 5:
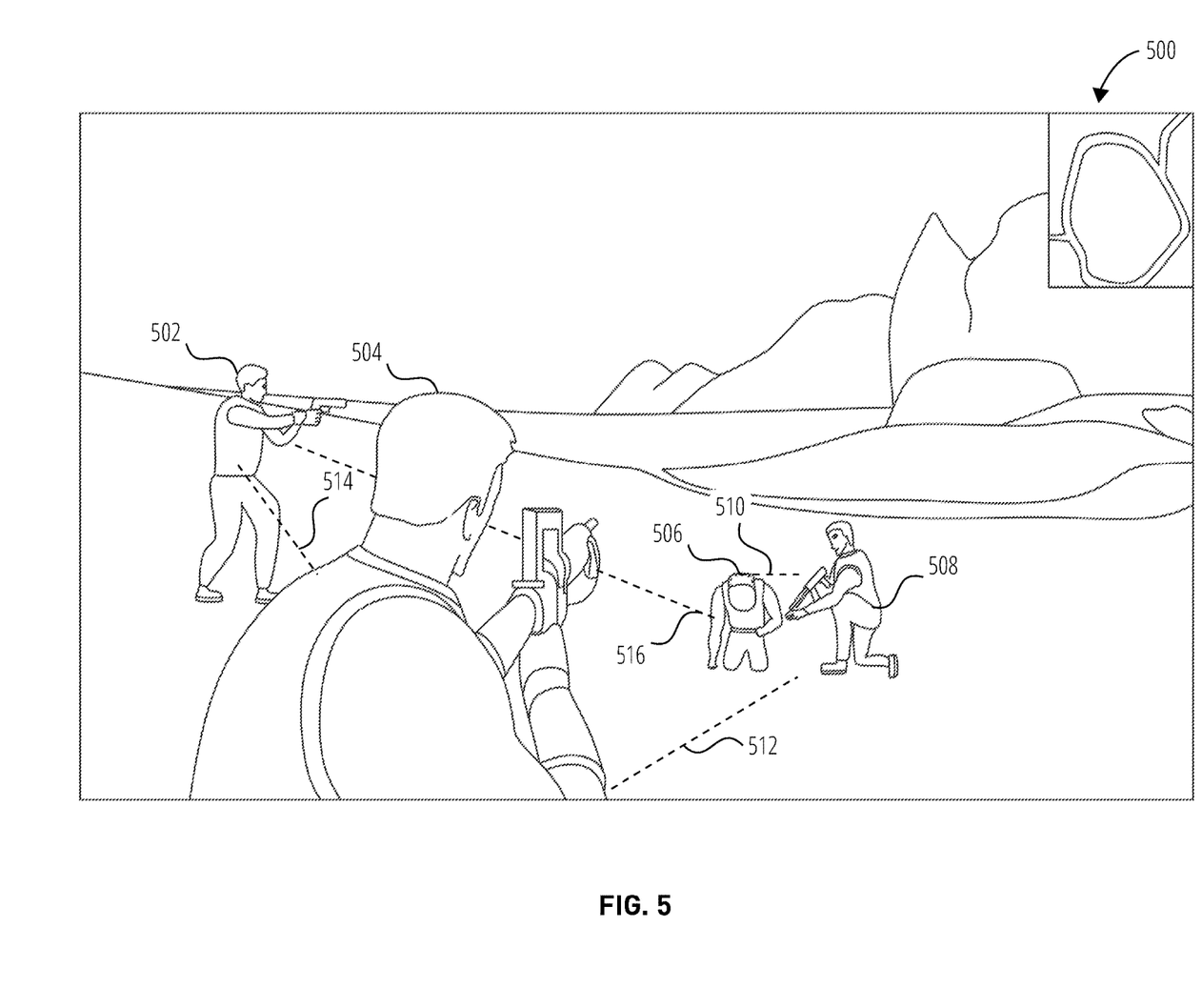
FIG. 5 is an example of a shared virtual environment, according to an embodiment.

FIG. 4 and FIG. 5 will be discussed together. FIG. 4 is an example of a shared virtual environment 400. FIG. 5 is an example of a shared virtual environment 500. As discussed herein and as shown in FIG. 4 and FIG. 5, the shared virtual environment can be different spaces. For example, as shown in FIG. 4, the shared virtual environment 400 can be a meeting space, such as a metaverse, omniverse, or other virtual (or alternative) reality space. As shown in FIG. 5, the shared virtual environment 500 can be a gaming space or other virtual (or alternative) reality space. The shared virtual environment 400 and the shared virtual environment 500 are merely examples and are not limitations of the shared virtual environments that the system 100 or the system 300 can be used within. Details about the shared virtual environments 400 and 500 and the actions of the avatars within the shared virtual environments can be shared as avatar context 112 (FIG. 1) or app context information 312 (FIG. 3).

The shared virtual environment 400 can include a first avatar 402, a second avatar 404, and a third avatar 406. As shown in FIG. 4, the first avatar 402 and the second avatar 404 can be engaged in a conversation at a first virtual distance 408. The third avatar 406 can be walking past the first avatar 402 and the second avatar 404 at a third avatar 406. As such, the distance (e.g., the first virtual distance 408 or the second virtual distance 410) and the actions of the avatars can be shared as the avatar context 112.

The shared virtual environment 500 can include a first avatar 502, a second avatar 504, a third avatar 506, and a fourth avatar 508. A virtual distance 510 can be a virtual distance between the third avatar 506 and the fourth avatar 508. A virtual distance 512 can be a virtual distance between the second avatar 504 and the third avatar 506 and the fourth avatar 508. A virtual distance 514 can be a virtual distance between the first avatar 502 and the second avatar 504. A virtual distance 516 can be a virtual distance between the first avatar 502 and the third avatar 506 and the fourth avatar 508.

As shown in FIG. 4, because the first avatar 402 is the first virtual distance 408, which is close enough to see the finer details of the second avatar 404, the fidelity requirement for the users controlling the first avatar 402 and the second avatar 404 can be increased to ensure the quality of avatars within the shared virtual environment 400. Additionally, as the third avatar 406, is at a farther distance, second virtual distance 410, away from the first avatar 402 and the second avatar 404, and neither of the first avatar 402 or the second avatar 404 can pick up the finer details of the third avatar 406, the fidelity requirement for the third avatar 406 can be reduced and the system (e.g., the system 100 or the system 300) can reduce the output fidelity 132 (FIG. 1) of the user device of third avatar 406 to conserve energy and reduce additional data transfer between the user device of the third avatar 406 and the shared virtual environment 400.

Similarly, as shown in FIG. 5, because the virtual distance 510 is less than the virtual distance 512 and the virtual distance 516 the users of the third avatar 506 and the fourth avatar 508 will be able to appreciate more details of each other's avatars than they will of the first avatar 502 or the second avatar 504. Further, because the virtual distance 514 is far enough away, neither the first avatar 502 nor the second avatar 504 may be able to appreciate the finer details of any other avatar within the shared virtual environment 500, and their respective fidelity requirement can be reduced. As such, the systems (e.g., the system 100 or the system 300) of the user devices of the first avatar 502 and the second avatar 504 can reduce the output fidelity to tune the output fidelity to the fidelity requirement.

The avatar context 112 can also include the context of the use of the shared virtual environment 200. For example, the avatar context 112 can include actions of the users, such as, whether avatars are moving quickly through an environment. For example, the third avatar 406 in FIG. 4 is walking across the screen, and as such, the users of the first avatar 402 or the second avatar 404 may be able to appreciate fewer details of the third avatar 406, and the fidelity requirement for the third avatar 406 can be reduced such that the output fidelity of the user device for the third avatar 406 can be reduced to tune the output fidelity to the fidelity requirement. In contrast, the first avatar 402 and the second avatar 404 are engaging in conversation. Thus, they can likely detect finer details of each other's avatars, and the fidelity requirement is high. Thus, the system can increase the output fidelity of the first avatar 402 and the second avatar 404 to tune their respective output fidelity to the fidelity requirement and ensure the best avatar experience within the shared virtual environment 400.

Moving to FIG. 5, the head of the third avatar 506 is looking toward the ground, and thus, if none of the users of the fourth avatar 508, the first avatar 502, or the second avatar 504 can see their face, and appreciate the details of their face, the fidelity requirement of the third avatar 506 can be reduced. Thus, the system of the user device of the third avatar 506 can reduce the output fidelity to tune the output fidelity to the fidelity requirement and conserve energy on the user device of the third avatar 506. Similarly, if the gaming objects in the hands of any of the first avatar 502, the second avatar 504, or the fourth avatar 508 are obstructing their view, the other avatars can receive that information via the avatar context 112 and their respective fidelity requirement can be reduced because other avatars can see fewer details of their avatar context within the shared virtual environment 500. Thus, the other user devices of the avatars that cannot be seen, can reduce their output fidelity to tune their output fidelity to the fidelity requirement to conserve energy of their respective user devices.

Figure 6:
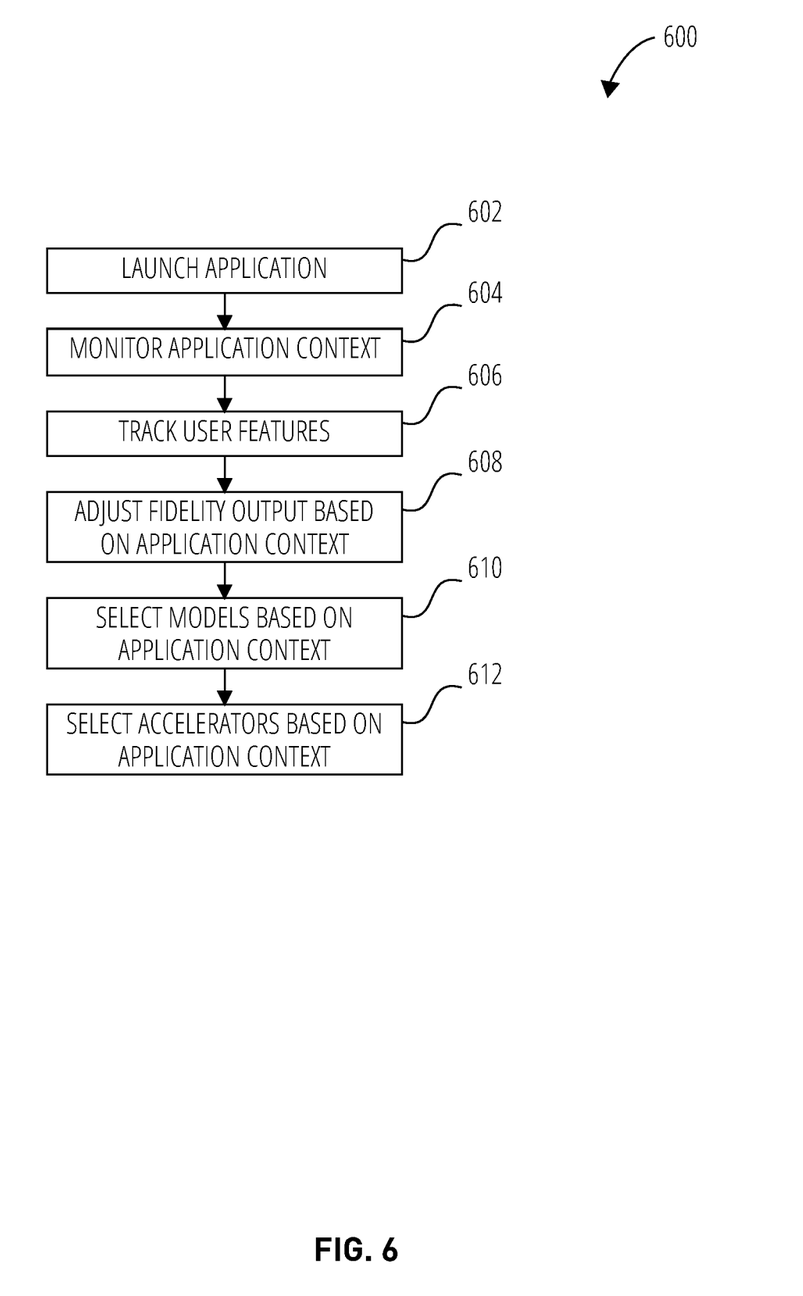
FIG. 6 is an example method for required sensor resolution and acceleration in a shared virtual environment, according to an embodiment.

FIG. 6 is an example method 600 for tuning an output fidelity to a fidelity requirement by controlling sensor parameters or acceleration of hardware of a user device (e.g., the first user device 202, the second user device 232, the third user device 234, or the (N)th user device 236 (all in FIG. 2)) including a system (e.g., system 100 (FIG. 1) or system 300 (FIG. 3)) in a shared virtual environment (e.g., the shared virtual environment 200 (FIG. 2) shared virtual environment 400 (FIG. 4) and shared virtual environment 500 (FIG. 5)). In examples, the method 600 can optionally include any of operations 602-612.

At operation 602, the method 600 can include the processing circuitry (e.g., the processing circuitry 108 (FIG. 1)) of the controller (e.g., the controller 106 (FIG. 1)) initiating, or starting an application (e.g., first application 216 (FIG. 2), second application 222 (FIG. 2), the application 224 (FIG. 2), or any other application on the user device). In examples, the application can help the user device join and operate within the shared virtual environment.

At operation 604, the method 600 can include the processing circuitry (e.g., the processing circuitry 108 (FIG. 1)) of the controller (e.g., the controller 106 (FIG. 1)) monitoring application context (e.g., the avatar context 112 (FIG. 1) or contextual data tracking 220 (FIG. 2), or the app context information 312 (FIG. 3)). As discussed herein, the avatar context can provide information about the avatars within the shared virtual environment, such as distance between avatars, activities the avatars are engaging in, movements of the avatars, or the like.

At operation 606, the method 600 can include the processing circuitry (e.g., the processing circuitry 108 (FIG. 1))

of the controller (e.g., the controller 106 (FIG. 1)) receiving signals from one or more sensors tracking user features. As discussed herein, the sensors can track the movements of the users of avatars within the shared virtual environment, record facial reactions, and record sound or voices or other audio outputs of the user of an avatar in the shared virtual environment.

At operation 608, the method 600 can include the processing circuitry (e.g., the processing circuitry 108 (FIG. 1)) of the controller (e.g., the controller 106 (FIG. 1)) to adjust output fidelity based on the application context to tune the output fidelity to the required fidelity. As discussed herein, the output fidelity can be tuned by decreasing a sampling rate, or fidelity, of sensors, switching the sensors used, or turning on or turning off the sensors.

At operation 610, the method 600 can include the processing circuitry (e.g., the processing circuitry 108 (FIG. 1)) of the controller (e.g., the controller 106 (FIG. 1)) to select models based on application context. The models (e.g., first model 314, the second model 316, or the nth model 318) can be used to operate or control any of the components of the computing device to one or more algorithms or instructions configured to guide the models.

At operation 612, the method 600 can include the processing circuitry (e.g., the processing circuitry 108 (FIG. 1)) of the controller (e.g., the controller 106 (FIG. 1)) to select accelerators based on application context. For example, the accelerators can be selected to either increase the output fidelity, by selecting an accelerator with more resource capacity available, or decrease output fidelity by selecting a lower power accelerator that can match the required output.

Therefore, operations 602-612 of method 600 can provide a comprehensive approach to enhancing user experiences in shared virtual environments by dynamically adjusting output fidelity to tune the output fidelity to match fidelity requirements of the shared virtual environment. The method 600 can adjust the output fidelity by manipulating sensor parameters and hardware acceleration in user devices that control the avatars within the shared virtual environment.

The method 600 can start by initiating applications that can seamlessly integrate user devices into the shared virtual environment, ensuring efficient operation. The method 600 can also employ context-aware monitoring to track user interactions, activities, and responses, leading to a more immersive experience for the users with avatars within the shared virtual environment. The method 600 can be particularly adept at user-centric sensor tracking, capturing movements, facial expressions, and audio outputs, thus personalizing the virtual experience for the users within the shared virtual environment.

The method 600 can include adaptive mechanisms for tuning output fidelity according to application context, which can involve strategic adjustments in sensor sampling rates or operational states. The method 600 can also select specific models and accelerators based on the application context, which can optimize performance and resource utilization. Collectively, these features contribute to a highly engaging, responsive, and efficient virtual environment, offering a nuanced and enriched user experience that reduces the power used by the user devices while they cannot appreciate the finer details of the other avatars within the shared virtual environment and the other users of avatars within the shared virtual environment cannot appreciate the finer details of their avatar.

Figure 7:
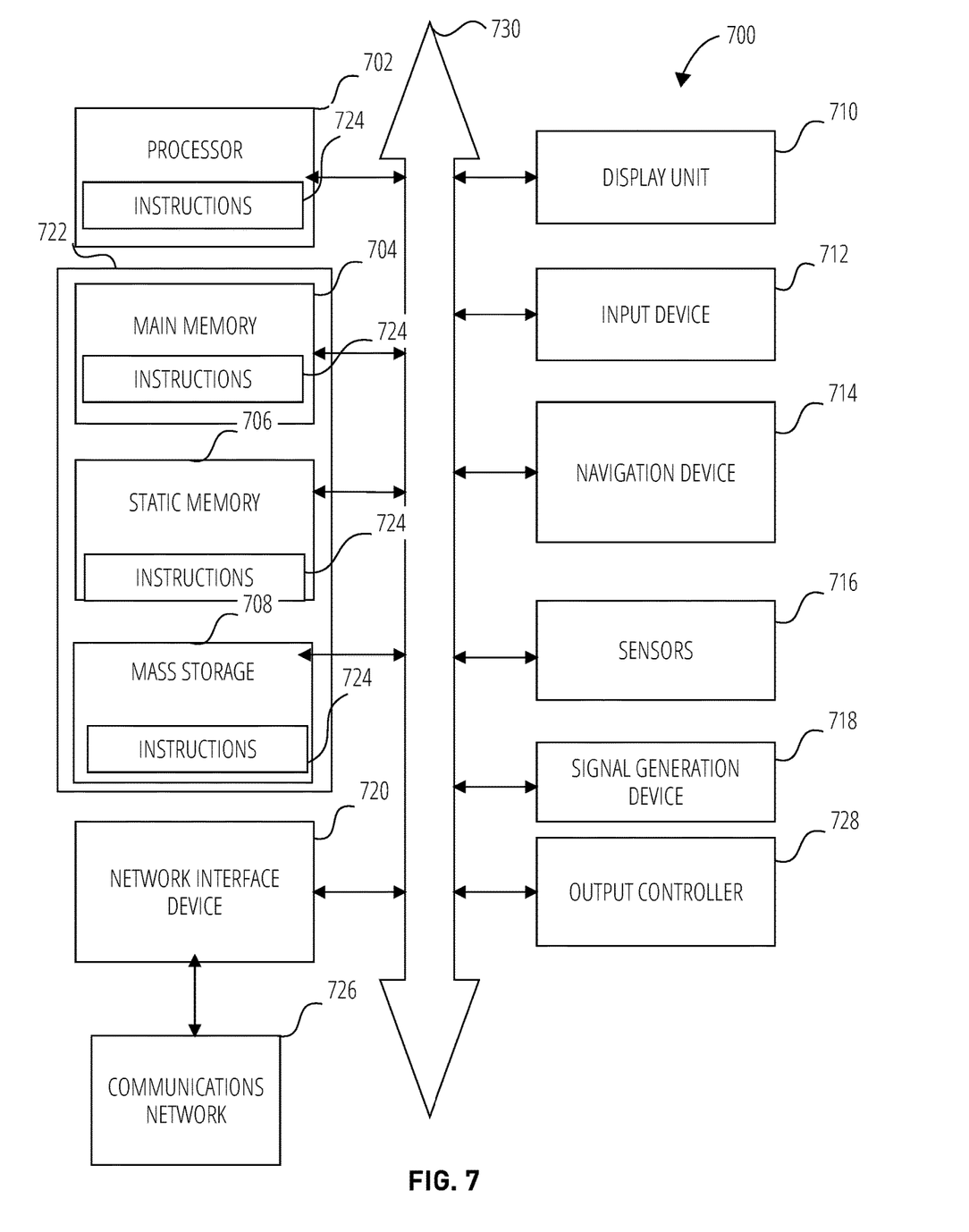
FIG. 7 is a schematic block diagram illustrating an example of a machine upon which one or more examples may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to conduct a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to conduct portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative examples, the machine 700 may operate as a standalone device or may be connected (e.g., networked) to other machines. In a networked deployment, the machine 700 may operate in the capacity of a server machine, a client machine, or both in server-client network environments. In an example, the machine 700 may function as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), and mass storage 708 (e.g., hard drives, tape drives, flash storage, or other block devices) some or all of which may communicate with each other via an interlink 530 (e.g., bus). The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a signal generation device 718 (e.g., a speaker), a network interface device 720, and one or more sensors 716, such as a global positioning system (GPS) sensor, compass, accelerometer, or another sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine-readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 702.11 family of standards known as Wi-Fi®, IEEE 702.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software. A transmission medium is a machine-readable medium.

The following, non-limiting examples, detail certain aspects of the present subject matter to solve the challenges and provide the benefits discussed herein, among others.

Example 1 is at least one machine-readable medium including instructions, which when executed by processing circuitry, cause the processing circuitry to perform operations to: receive an avatar context from an application status pool, the avatar context based on avatars in a shared virtual environment or computing users associated with the avatars in the shared virtual environment; determine, based on the avatar context, a fidelity requirement of sensor inputs to establish the shared virtual environment; and alter one or more operating parameters of the shared virtual environment to tune an output fidelity based on the fidelity requirement.

In Example 2, the subject matter of Example 1 optionally includes wherein the instructions cause the processing circuitry to perform operations to: receive a first signal from a first sensor and a second signal from a second sensor, each of the first signal and the second signal indicative of a feature of a first computing user associated with a first avatar in the shared virtual environment; and update the fidelity requirement based on the feature of the first computing user associated with the first avatar in the shared virtual environment indicated by at least one of the first signal or the second signal.

In Example 3, the subject matter of Example 2 optionally includes wherein the instructions cause the processing circuitry to perform operations to: reduce a sampling rate of at least one of the first sensor or the second sensor to tune the output fidelity to the fidelity requirement.

In Example 4, the subject matter of any one or more of Examples 2-3 optionally include wherein the first sensor includes a camera, and wherein the second sensor includes a depth sensor.

In Example 5, the subject matter of Example 4 optionally includes wherein the instructions cause the processing circuitry to perform operations to: deactivate a first sensor that delivers a higher output fidelity than needed based on the fidelity requirement; activate a second sensor with reduced power or processing requirements than the first sensor to tune the output fidelity to the fidelity requirement; and reactivate the first sensor, based on an increased fidelity requirement, to increase the output fidelity to tune the output fidelity to the fidelity requirement.

In Example 6, the subject matter of any one or more of Examples 1-5 optionally include wherein the application status pool includes computing capabilities of other users in the shared virtual environment, and wherein the instructions cause the processing circuitry to perform operations to: update the fidelity requirement based on the computing capabilities of the other computing users associated with avatars in the shared virtual environment.

In Example 7, the subject matter of any one or more of Examples 1-6 optionally include wherein the instructions cause the processing circuitry to perform operations to: receive a status report from a hardware resource pool, the status report including a load summary for each hardware component included in the hardware resource pool; and select a hardware component based on the avatar context to tune the output fidelity to the fidelity requirement.

In Example 8, the subject matter of any one or more of Examples 1-7 optionally include wherein the avatar context comprises a type of activity within the shared virtual environment.

In Example 9, the subject matter of any one or more of Examples 1-8 optionally include a first model configured to alter one or more parameters of the shared virtual environment to increase the output fidelity; and a second model configured to alter one or more parameters of the shared virtual environment to decrease the output fidelity; wherein the instructions configure the processing circuitry to perform operations to: select, in response to the fidelity requirement being less than the output fidelity, the first model to decrease the output fidelity to tune the output fidelity to the fidelity requirement; and select, in response to the fidelity requirement being higher than the output fidelity, the second model to increase the output fidelity to tune the output fidelity to the fidelity requirement.

In Example 10, the subject matter of any one or more of Examples 1-9 optionally include wherein the avatar context includes one or more of: a virtual distance between avatars within the shared virtual environment; a role of an avatar in the application; a level of attention for the computing users representing avatars within the shared virtual environment; visibility of avatars within the shared virtual environment; or a type of application defining the shared virtual environment.

Example 11 is a system for optimizing sensor data processing in a shared virtual environment, the system comprising: a processor including processing circuitry; and a memory storing instructions executable by the processor to cause the processing circuitry to perform operations to: receive context data indicative of a virtual environment interaction; determine a fidelity requirement for sensor data based on the context data; and adjust sensor data processing parameters to align an output fidelity with the fidelity requirement.

In Example 12, the subject matter of Example 11 optionally includes wherein the context data includes virtual distances between avatars representing users within the shared virtual environment.

In Example 13, the subject matter of any one or more of Examples 11-12 optionally include wherein the context data further includes at least one of: user attention level, type of user activity, or virtual environment characteristics.

In Example 14, the subject matter of any one or more of Examples 11-13 optionally include wherein the sensor data processing parameters include sensor sampling rates, sensor selection, or sensor resolution.

In Example 15, the subject matter of any one or more of Examples 11-14 optionally include wherein the instructions cause the processing circuitry to perform operations to: select a model for processing the sensor data based on the fidelity requirement.

In Example 16, the subject matter of any one or more of Examples 11-15 optionally include wherein the instructions cause the processing circuitry to perform operations to: select a hardware accelerator from a plurality of available hardware accelerators to process the sensor data in accordance with the fidelity requirement.

In Example 17, the subject matter of any one or more of Examples 11-16 optionally include wherein the sensor data is derived from a plurality of sensors including a camera and a depth sensor, and wherein the instructions cause the processing circuitry to perform operations to: selectively activate or deactivate one or more of the plurality of sensors based on the fidelity requirement.

In Example 18, the subject matter of any one or more of Examples 11-17 optionally include wherein the instructions cause the processing circuitry to perform operations to: modify the output fidelity based on the adjusted sensor data processing parameters.

In Example 19, the subject matter of any one or more of Examples 11-18 optionally include wherein the instructions cause the processing circuitry to perform operations to: dynamically adjust the fidelity requirement in real time as the context data changes during the virtual environment interaction.

In Example 20, the subject matter of any one or more of Examples 11-19 optionally include wherein the instructions cause the processing circuitry to perform operations to: communicate the adjusted sensor data processing parameters to other user devices associated with avatars within the shared virtual environment to coordinate resource optimization across multiple users.

Example 21 is an apparatus, system, or method including any element of any of Examples 1-20.

The above-detailed description includes references to the accompanying drawings, which form a part of the detailed description. The drawings show, by way of illustration, specific examples that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5). Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The above description is intended to be illustrative, and not restrictive. For example, the above-described examples (or one or more aspects thereof) may be used in combination with each other. Other examples may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the examples should be determined with reference to the appended claims, along with the full scope of equivalents to which such claims are entitled.

What is claimed is:

1. At least one non-transitory machine-readable medium including instructions, which when executed by processing circuitry, cause the processing circuitry to perform operations to:
   receive an avatar context from an application status pool, the avatar context based on avatars in a shared virtual environment or computing users associated with avatars in the shared virtual environment;
   determine, based on the avatar context, a fidelity requirement of sensor inputs to establish the shared virtual environment;
   alter one or more operating parameters of the shared virtual environment to tune an output fidelity based on the fidelity requirement;
   receive a first signal from a first sensor and a second signal from a second sensor, each of the first signal and the second signal indicative of a feature of a first computing user associated with a first avatar in the shared virtual environment; and
   update the fidelity requirement based on the feature of the first computing user associated with the first avatar in the shared virtual environment indicated by at least one of the first signal or the second signal.

2. The at least one machine-readable medium of claim 1, wherein the instructions cause the processing circuitry to perform operations to:
   reduce a sampling rate of at least one of the first sensor or the second sensor to tune the output fidelity to the fidelity requirement.

3. The at least one machine-readable medium of claim 1, wherein the first sensor includes a camera, and wherein the second sensor includes a depth sensor.

4. The at least one machine-readable medium of claim 3, wherein the instructions cause the processing circuitry to perform operations to:
   deactivate a first sensor that delivers a higher output fidelity than needed based on the fidelity requirement;
   activate a second sensor with reduced power or processing requirements than the first sensor to tune the output fidelity to the fidelity requirement; and
   reactivate the first sensor, based on an increased fidelity requirement, to increase the output fidelity to tune the output fidelity to the fidelity requirement.

5. The at least one machine-readable medium of claim 1, wherein the application status pool includes computing capabilities of other users in the shared virtual environment, and wherein the instructions cause the processing circuitry to perform operations to:
   update the fidelity requirement based on the computing capabilities of the other computing users associated with avatars in the shared virtual environment.

6. The at least one machine-readable medium of claim 1, wherein the instructions cause the processing circuitry to perform operations to:

receive a status report from a hardware resource pool, the status report including a load summary for each hardware component included in the hardware resource pool; and select a hardware component based on the avatar context to tune the output fidelity to the fidelity requirement.

7. The at least one machine-readable medium of claim 1, wherein the avatar context comprises a type of activity within the shared virtual environment.

8. The at least one machine-readable medium of claim 1, comprising:
    a first model configured to alter one or more parameters of the shared virtual environment to increase the output fidelity; and
    a second model configured to alter one or more parameters of the shared virtual environment to decrease the output fidelity;
    wherein the instructions configure the processing circuitry to perform operations to:
    select, in response to the fidelity requirement being less than the output fidelity, the first model to decrease the output fidelity to tune the output fidelity to the fidelity requirement; and
    select, in response to the fidelity requirement being higher than the output fidelity, the second model to increase the output fidelity to tune the output fidelity to the fidelity requirement.

9. The at least one machine-readable medium of claim 1, wherein the avatar context includes one or more of:
    a virtual distance between avatars within the shared virtual environment;
    a role of an avatar in the application;
    a level of attention for the computing users representing avatars within the shared virtual environment;
    visibility of avatars within the shared virtual environment; or
    a type of application defining the shared virtual environment.

10. A system for optimizing sensor data processing in a shared virtual environment, the system comprising:
    a processor including processing circuitry; and
    a memory storing instructions executable by the processor to cause the processing circuitry to perform operations to:
    receive context data indicative of a virtual environment interaction;
    determine a fidelity requirement for sensor data based on the context data; and
    adjust sensor data processing parameters to align an output fidelity with the fidelity requirement; and
    communicate the adjusted sensor data processing parameters to other user devices associated with avatars within the shared virtual environment to coordinate resource optimization across multiple users.

11. The system of claim 10, wherein the context data includes virtual distances between avatars representing users within the shared virtual environment.

12. The system of claim 10, wherein the context data further includes at least one of: user attention level, type of user activity, or virtual environment characteristics.

13. The system of claim 10, wherein the sensor data processing parameters include sensor sampling rates, sensor selection, or sensor resolution.

14. The system of claim 10, wherein the instructions cause the processing circuitry to perform operations to:
    select a model for processing the sensor data based on the fidelity requirement.

15. The system of claim 10, wherein the instructions cause the processing circuitry to perform operations to:
    select a hardware accelerator from a plurality of available hardware accelerators to process the sensor data in accordance with the fidelity requirement.

16. The system of claim 10, wherein the sensor data is derived from a plurality of sensors including a camera and a depth sensor, and wherein the instructions cause the processing circuitry to perform operations to:
    selectively activate or deactivate one or more of the plurality of sensors based on the fidelity requirement.

17. The system of claim 10, wherein the instructions cause the processing circuitry to perform operations to:
    modify the output fidelity based on the adjusted sensor data processing parameters.

18. The system of claim 10, wherein the instructions cause the processing circuitry to perform operations to:
    dynamically adjust the fidelity requirement in real time as the context data changes during the virtual environment interaction.

* * * * *